United States Patent [19]

Herster

[11] Patent Number: 5,631,445
[45] Date of Patent: May 20, 1997

[54] AUTOMOTIVE FUEL TANK ELECTRICAL FITTING

[75] Inventor: Alan M. Herster, Beverly Hills, Mich.

[73] Assignee: Ford Motor Company, Dearborn, Mich.

[21] Appl. No.: 319,693

[22] Filed: Oct. 7, 1994

[51] Int. Cl.⁶ .................................. H02G 3/22
[52] U.S. Cl. .................. 174/151; 174/65 R; 439/587
[58] Field of Search .................. 174/151, 65 R, 174/77 R, 22 R, 65 SS, 65 G, 153 R; 439/587, 936

[56] References Cited

U.S. PATENT DOCUMENTS

| | | | |
|---|---|---|---|
| 706,066 | 4/1902 | Shroyer | 101/401 |
| 2,115,495 | 4/1938 | Mapelsden | 174/70 R |
| 2,948,773 | 4/1960 | Hawes | 174/153 R |
| 3,308,316 | 3/1967 | Pfahl | 174/18 X |
| 4,083,391 | 4/1978 | Parkinson et al. | 144/178 |
| 4,492,421 | 1/1985 | Ito | 439/271 |
| 4,700,999 | 10/1987 | Probst | 439/271 |
| 5,113,037 | 5/1992 | King, Jr. et al. | 174/87 |
| 5,278,357 | 1/1994 | Yamanashi | 174/151 |

FOREIGN PATENT DOCUMENTS 1352578  11/1987  U.S.S.R. .................. 174/151

*Primary Examiner*—Hyung S. Sough
*Attorney, Agent, or Firm*—David B. Kelley

[57] ABSTRACT

A fitting for routing electrical wires to a fuel pump within an automotive fuel tank has a plug with a plurality of insulated, unbroken wires passing therethrough with the insulation removed from the center sections of the wires encased within the plug, which is sealed with an anaerobic sealant to provide a bond between the exposed wire of the center sections and the plug while also affording a barrier against fuel vapor migration along the wires or through pores between the wires and the plug. A pair of flexible, outwardly extending locking tabs on the plug compress inwardly to allow the fitting through an opening in the fuel tank and once therein return to an extended position retaining the fitting within the opening.

11 Claims, 2 Drawing Sheets

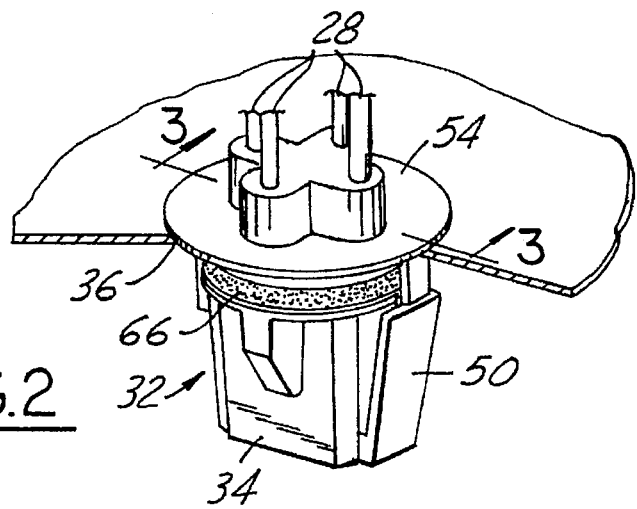
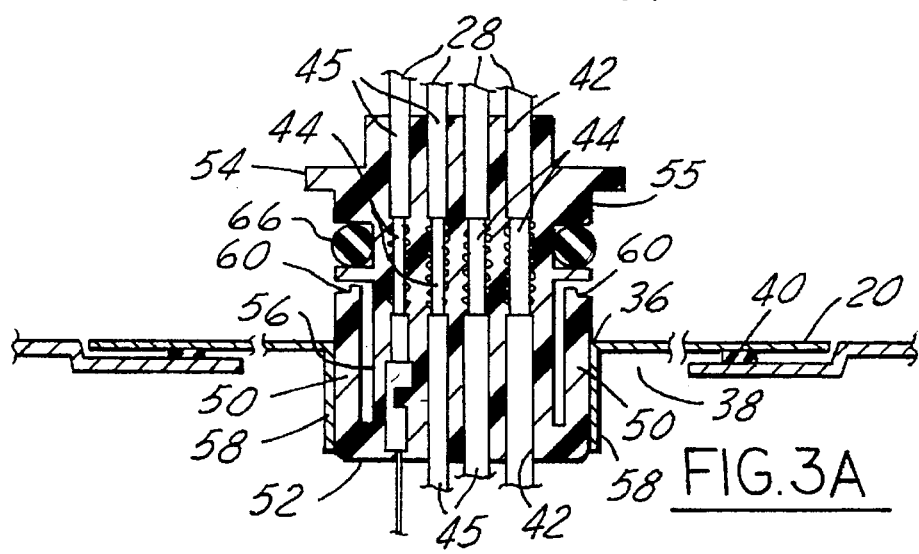
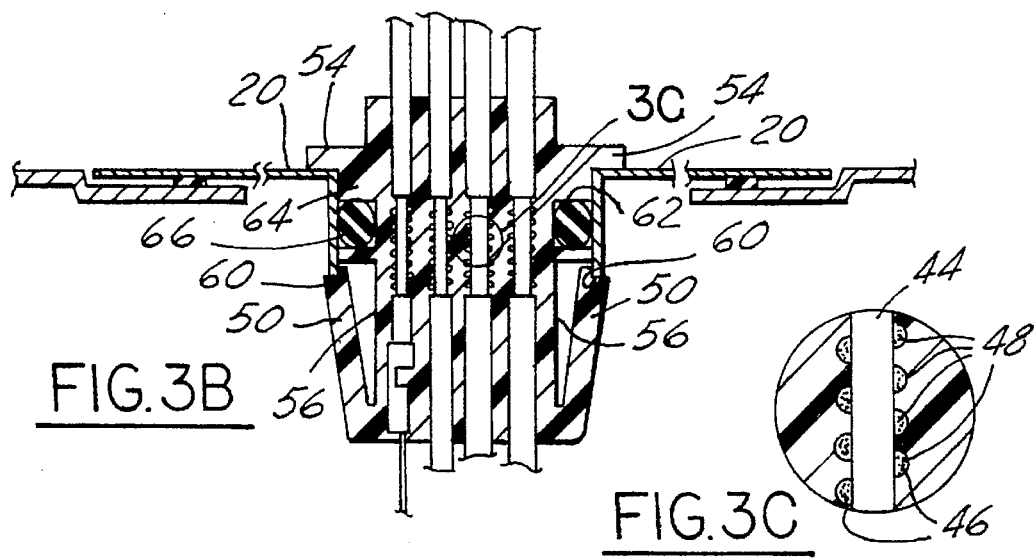

AUTOMOTIVE FUEL TANK ELECTRICAL FITTING

FIELD OF THE INVENTION

The present invention relates to automotive fuel tank electrical fittings, and, more particularly, to an electrical fitting for routing wires to an in-tank mounted fuel pump which provides an effective barrier against fuel vapor emissions from the fuel tank.

BACKGROUND OF THE INVENTION

Conventional automotive fuel delivery systems utilize an electric fuel pump mounted in the fuel tank as a motive force to deliver fuel from the fuel tank to the engine. Power is supplied to the fuel pump via electrical wires connected between a voltage source, such as an alternator or a vehicle battery, and the pump terminals. In order to reach the pump terminals, the electrical wires must pass through an opening in the fuel tank, which, unless properly sealed, potentially provides a path for fuel vapor leakage. Minimizing such vapor leakage is desirable due to increasingly stringent government regulations on automotive fuel vapor emissions.

Sealing of an opening has been accomplished in several ways, many involving a bushing or fitting adapted for placement in the opening with the wires passing therethrough, as shown in U.S. Pat. No. 3,308,316 (Pfahl). Although the wires are fitted as tightly as possible through the fitting, for example by insert molding, spaces or pores typically exists between them through which fuel vapor may leak.

Fuel vapor may also migrate along the wires, which are typically wrapped with insulation to maintain the electrical integrity of the connection. Some wire insulation swells when exposed to fuel causing cracking and breakage, thus revealing bare wire. Other types of insulation shrink when exposed to fuel, increasing the space between the wire and the fitting, thus increasing the size of the fuel vapor leakage path. When the insulation on wires passing through a fitting deteriorates due to shrinking or swelling, or when the wires are not sufficiently bound to the fitting, the pores between the wire and the fitting are widened providing a greater leak path for fuel vapor. In addition, the pull strength of the wires decreases as the bond between the fitting and the wires deteriorates, jeopardizing the electrical connection to the pump terminals.

Prior electrical fittings do not effectively compensate for these problems, in part by failing to use the proper wire, by failing to adequately seal the space between the wires and the fitting, and by failing to sufficiently bond the wires to the fitting. Other electrical connectors, such as that disclosed in U.S. Pat. No. 4,492,421 (Ito), require connection of two wires therein, potentially compromising the integrity of the connector through decreased pull strength and additional complexity. Unless properly sealed, such connectors potentially increase liquid or vapor migration due to capillary action at the broken cross-section of the wires.

SUMMARY OF THE INVENTION

Responsive to the deficiencies of the related art, the present invention provides an electrical fitting for an opening in a fuel tank to provide an effective barrier against fuel vapor emissions from the fuel tank, the fitting comprising a plug fitted into the opening with a plurality of unbroken electrical wires passing therethrough and a plurality of pores therebetween. Each of the plurality of wires has two sections with insulation thereon, a center section stripped of the insulation positioned between the two insulated sections, and sealing for sealing the plurality of pores between the plurality of wires and the plug, such as a vacuum impregnated anaerobic sealant. The wire center section is stripped of insulation to provide a better bond between the wire surface and the plug, and to allow the sealant to provide an interruption of fuel vapor migration between the wire and the plug. The fitting has retaining means for retaining the plug to the fuel tank comprising a pair of flexible tabs on the fitting which deflect inward upon insertion into the opening in the fuel tank and once therein return to a position retaining the fitting within the tank.

Accordingly, it is an object of the present invention to provide a fuel tank electrical fitting having improved pull strength.

It is also an object of the present invention is to provide a new and improved fuel tank electrical fitting which minimizes fuel vapor leakage along the wires passing therethrough.

Another object is to provide a sealed fuel tank electrical fitting for routing wires to an in-tank mounted electric fuel pump.

Yet another object of the present invention is to provide an electrical fitting which has unbroken, continuous wires passing therethrough and therefore does not require connection of the wires therein.

Still another object is to provide an electrical fitting which is inexpensive to manufacture and easy to install.

An advantage of the present invention is that the electrical wires pass unbroken through the fitting thereby decreasing assembly time and expense as well as decreasing fuel vapor migration along the wires.

Another advantage of the present is that complex riveting operations are not required to install the fitting to the fuel tank.

A feature of the present invention is an unbroken, continuous set of wires passing through bores in the fitting, each wire having a center section stripped of insulation within the bore so that the sealant can provide a better bond between the wire and the fitting.

Another feature of the present invention is a pair of flexible tabs on the fitting which deflect inwardly upon insertion into the fuel tank and once therein return to a position retaining the fitting within the tank.

BRIEF DESCRIPTION OF THE DRAWINGS

FIG. 2 is a perspective view of an electrical fitting according to a preferred embodiment of the present invention shown installed in a fuel tank flange, the flange being partially cut-away.

FIG. 3A is a cross-sectional view taken along line 3—3 of FIG. 2 showing a fitting according to a preferred embodiment partially inserted in a fuel tank opening with locking tabs in the compressed position.

FIG. 3B is a cross-sectional view similar to FIG. 3A but showing the fitting fully inserted in the fuel tank opening with the locking tabs in the extended position.

FIG. 3C is an enlarged view of a section of FIG. 3B showing sealant filled pores near the wires running through the fitting.

DETAILED DESCRIPTION OF THE PREFERRED EMBODIMENT

Figure 1:
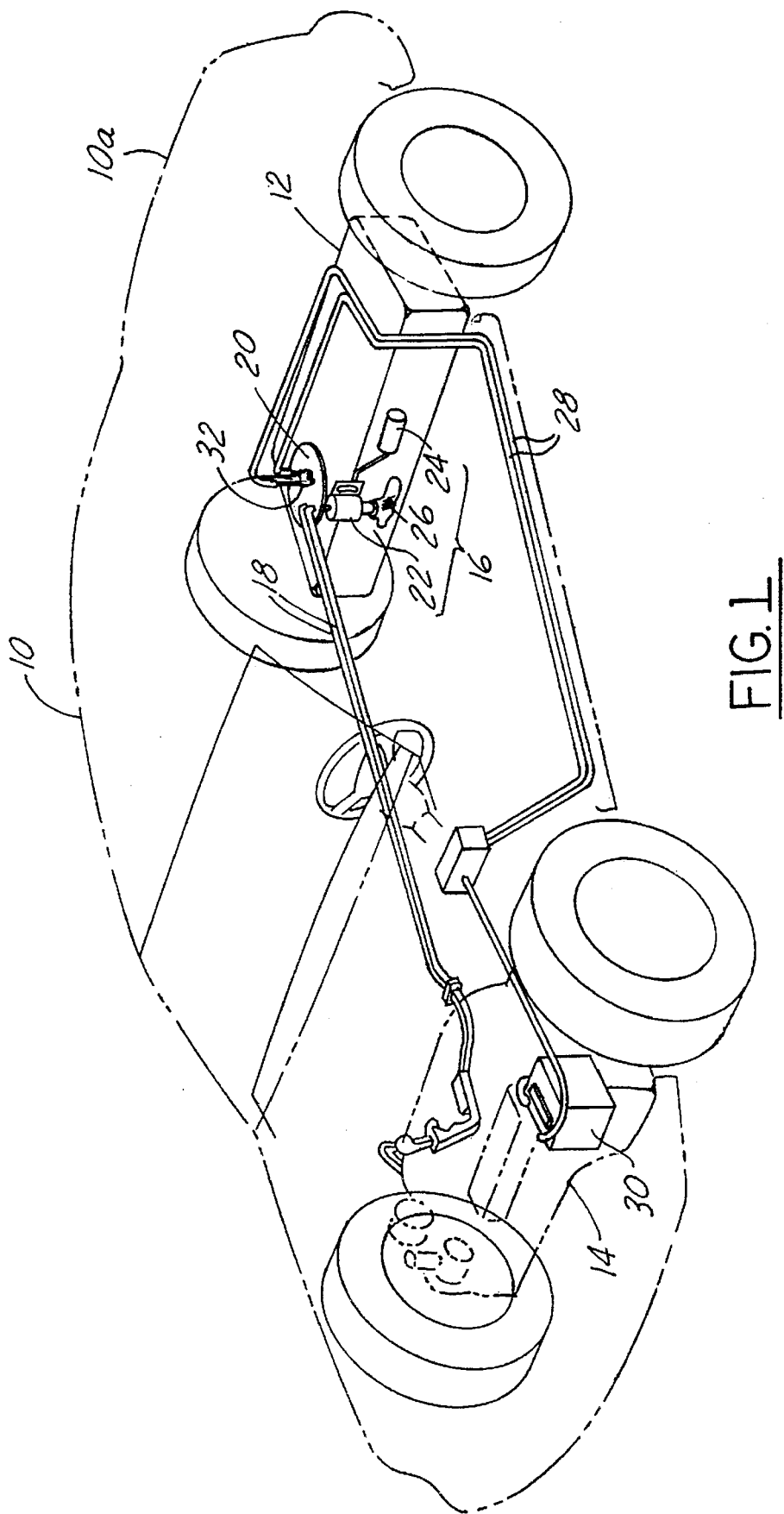
FIG. 1 is a perspective view of a vehicle with a fuel tank having an electrical fitting according to a preferred embodiment of the present invention attached thereto.

Referring to the drawings, and in particular FIG. 1 thereof, vehicle 10 is shown with a fuel delivery system therein for providing fuel to engine 14. The fuel delivery system comprises a fuel tank 12 in a rear section 10a of vehicle 10 in which a fuel delivery module 16 is mounted therein in a known fashion, and a pair of fuel lines 18, one for delivering fuel from tank 12 to engine 14 and the other for returning fuel from engine 14 to fuel tank 12. Fuel delivery module 16, which is mounted to fuel tank 12 via cover 20, has an electric fuel pump 22 connected to one of the fuel lines 18, a pump sender 24 for signalling the fuel level within tank 12, and a fuel filter 26 on the inlet side of pump 22. Electrical wires 28 pass through cover 20 to supply pump 22 and sender 24 with electrical power from battery 30. An electrical fitting 32 according to the present invention provides a sealed conduit for wires 28 to pass through cover 20 while minimizing fuel vapor emissions from tank 12. As will be understood by those skilled in the art, FIG. 1 is for illustrative purposes only and not meant to indicate vehicle or fuel delivery system dimensions, and is but one rendering of a fuel delivery system for which the present invention can appropriately be used.

Turning now to FIG. 2, fitting 32 is seen comprising a plug 34 with wires 28 passing therethrough. Plug 34 is fitted into an opening 36 in cover 20, and cover 20 is mounted to fuel tank 12 to cover a larger opening 38 through which the in-tank fuel delivery module 16 is installed. Cover 20 has seal 40 on an underside to provide a seal between cover 20 and fuel tank 12 (FIG. 3A).

As best seen in FIG. 3A, wires 28 pass unbroken through plug 34. That is, wires 34 are not cut or broken, but are continuous, and therefore do not need to be connected within fitting 32. Expensive and complicated assembly is thus avoided.

Wires 28 have insulation 42 thereon to secure the electrical integrity of the connection and prevent short circuits, as is well known. Preferably, the insulation 42 is fuel resistant, for example a moisture cured, high density polyethylene insulation, which swells only minimally when exposed to fuel so as to prevent cracking and loosening of the wires within plug 34.

Referring still to FIG. 3A, each of wires 28 have a center section 44 with insulation 42 removed, the center section 44 being encased within plug 34 and defining two insulated sections 45 for each wire, one on either side of center section 44. This feature provides several important advantages over prior fittings, including increased pull strength through better bonding of wires 28 to plug 34, and improved curing of sealant 46 (FIG. 3C), which is applied to fitting 32 as described below, to form a tighter barrier against fuel vapor migration along insulation 42. Sealant 46 cures better in the presence of metal than insulation 42, and thus the exposed metal of center section 44 bonds better to plug 34 to provide increased pull strength.

Wires 28 are preferably insert molded into plug 34 after removal of insulation 42 from center sections 44. As an alternative to insulation removal, bands of a metallic substance, such as aluminum or copper, can be applied to the exterior surface of insulation 42 in those areas of wires 28 to be molded into plug 34. Plug 34 is preferably made of a thermoplastic material, such as acetal, which does not degrade with long term exposure to fuels, petroleum based or otherwise.

After wires 28 are configured and molded into plug 34 as described above, fitting 34 is sealed with an anaerobic sealant 46. The sealant 46 is preferably applied in conjunction with a vacuum impregnation process, such as the Loctite® porosity sealing process, or other similar method, which removes oxygen and other gases trapped in pores 48 (FIG. 3C), particularly between insulation center sections 44, and plug 34. Pores 48 are then filled with sealant 46 to provide a barrier against fuel vapor migration from within tank 12 to an outer area. The sealant also serves to bond wires 28 to plug 34 as described above. A sealant 46, such as dimethacrylate, is preferred which cures to a thermoset plastic and which provides excellent bonding between the metal wire of center sections 44 and the acetal of plug 34. It will understood by those skilled in the art that pores 48 shown in FIGS. 3A, 3B and 3C are not meant to indicate actual size but are for illustrative purposes only.

After fitting 32 has been constructed as described above, it is fitted into opening 36 in cover 20 and wires 28 are connected to fuel pump 22. Retention of fitting 32 to cover 20 is accomplished by a pair of flexible locking tabs 50 which preferably are integrally formed with plug 34 (FIGS. 3A and 3B). Tabs 50 project from lower end 52 of plug 34 toward circular flange 54 on an upper end 55 of plug 34 and, before being pushed through opening 36 are in the extended position similar to that of FIG. 3B. That is, tabs 50 are spaced from the exterior surface 56 of plug 34 such that the perimeter of plug 34 is greater than the perimeter of opening 36.

When fitting 32 is inserted through opening 36, tabs 50 are compressed inwardly toward surface 56 by downstanding ring 58 as shown in FIG. 3A so that lower end 52 fits through opening 36. That is, the perimeter of plug 34 is less than that of opening 36. Downstanding ring 58 can be stamped or otherwise formed as part of cover 20. After passing through opening 36, tabs 50 spring away from surface 56 to the extended position of FIG. 3B. In that position, notched sections 60 on tabs 50 engage with downstanding ring 58 to stabilize fitting 32 within opening 36, and circular flange 54 abuts the exterior of cover 20 to prevent fitting 32 from passing completely through opening 36. To that end, the perimeter of flange 54 is greater than that of opening 36. With the push-thru type locking tabs 50 on plug 34, fitting 32 can be quickly and easily assembled to fuel tank 12 without complex or time consuming riveting operations.

To provide a seal between fitting 32 and downstanding ring 58, plug 34 has an annular groove 62 in collar 64 between flange 54 and tabs 50 for receiving an O-ring 66 or other sealing device known to those skilled in the art and suggested by this disclosure. O-ring 66 is preferably made of fluorocarbon.

An electrical fitting 32 as described above provides a sealed closure for a fuel tank opening which minimizes fuel vapor leakage from the fuel tank 12 while also affording increased pull strength for the wires passing through the fitting.

Although the preferred embodiment of the present invention has been disclosed, various changes and modifications may be made without departing from the scope of the invention as set forth in the appended claims.

I claim:

1. A sealed electrical fitting for wires passing through an opening in a fuel tank, comprising:

(1) a chamberless, substantially solid plug adapted to be fitted into the opening;

(2) a plurality of unbroken electrical wires passing through a corresponding plurality of bores extending through the plug and defining a plurality of pores therebetween, each of the plurality of wires having:
(i) two insulated sections with insulation thereon; and
(ii) a center section stripped of the insulation and positioned between the two sections within one of the plurality of bores in the plug;

(3) means for sealing the plurality of pores between the plurality of wires and the plug; and (4) means for retaining the plug to the fuel tank.

2. A fitting according to claim 1 wherein the plug has an exterior surface, an upper end, and a lower end insertable into the fuel tank, and wherein the retaining means comprises:

a plurality of flexible tab on the lower end extending toward the upper end and projecting outwardly from the exterior surface, the plurality of flexible tabs having an extended position spaced from the exterior surface such that a perimeter of the plug is greater than a perimeter of the opening, the plurality of flexible tabs also having a compressed position deflected radially inward toward the exterior surface to allow the lower end to fit through the opening, the plurality of flexible tabs returning to the extended position upon insertion of the plug into the opening so as to retain the fitting to the tank.

3. A fitting according to claim 2 wherein the plug has an annular groove thereon for receiving an O-ring to provide a seal between the plug and the fuel tank.

4. A fitting according to claim 3 wherein the upper end of the plug has a flange such that a perimeter size of the flange is a perimeter size greater than a perimeter size of the opening to prevent the fitting from passing completely through the opening.

5. A fitting according to claim 4 wherein the means for sealing comprises a vacuum impregnated anaerobic sealant.

6. A fitting according to claim 5 wherein the plurality of wires have a fuel resistant insulation thereon.

7. A fitting according to claim 5 wherein the plug is made of a thermoplastic material.

8. A sealed electrical fitting for wires passing through an opening in a fuel tank to an in-tank mounted electrical fuel pump, comprising:

(a) a chamberless, substantially solid, one-piece plug having:
(i) an exterior surface, an upper end, and a lower end insertable into the opening;
(ii) a flange on the upper end such that a perimeter size of the flange is greater than a perimeter size of the opening to prevent the fitting from passing completely through the opening;
(iii) an annular groove between the flange and the lower end for receiving an O-ring to provide a seal between the plug and the fuel tank; and
(vi) a pair of flexible tabs on the lower end for retaining the fitting to the fuel tank;

(b) a plurality of unbroken electrical wires passing through a corresponding plurality of bores extending through the plug defining a plurality of pores therebetween, each of the plurality of wires having:
(i) two insulated sections with a fuel resistant insulation thereon;
(ii) a center section stripped of the insulation and positioned between the two sections within of the plug; and (c) means for sealing the plurality of pores between the plurality of wires and the plug, such that an engagement member is not needed to retain the wire in the longitudinal direction of the bores.

9. A fitting according to claim 8 wherein the pair of flexible tabs on the lower end extend toward the upper end and project outwardly from the exterior surface, the pair of flexible tabs having an extended position spaced from the exterior surface such that a perimeter of the plug is greater than a perimeter of the opening, the pair of flexible tabs also having a compressed position deflected radially inward toward the exterior surface to allow the lower end to fit through the opening, the pair of flexible tabs returning to the extended position upon insertion of the plug into the opening so as to retain the fitting to the tank.

10. A fitting according to claim 9 wherein the means for sealing comprises vacuum impregnated dimethacrylate.

11. A fitting according to claim 10 wherein the plug is made of acetal.

* * * * *